United States Patent
Reigo

(10) Patent No.: US 10,136,576 B2
(45) Date of Patent: Nov. 27, 2018

(54) NAVIGATION FOR A ROBOTIC WORKING TOOL

(71) Applicant: HUSQVARNA AB, Huskvarna (SE)

(72) Inventor: Peter Reigo, Djursholm (SE)

(73) Assignee: HUSQVARNA AB, Huskvarna (SE)

(*) Notice: Subject to any disclaimer, the term of this patent is extended or adjusted under 35 U.S.C. 154(b) by 0 days.

(21) Appl. No.: 15/035,662

(22) PCT Filed: Nov. 12, 2013

(86) PCT No.: PCT/SE2013/051329
§ 371 (c)(1),
(2) Date: May 10, 2016

(87) PCT Pub. No.: WO2015/072896
PCT Pub. Date: May 21, 2015

(65) Prior Publication Data
US 2016/0278285 A1 Sep. 29, 2016

(51) Int. Cl.
*A01D 34/00* (2006.01)
*G05D 1/02* (2006.01)
(Continued)

(52) U.S. Cl.
CPC .......... *A01D 34/008* (2013.01); *B60L 1/003* (2013.01); *B60L 11/14* (2013.01); *G05D 1/0265* (2013.01); *G05D 1/0272* (2013.01); *G05D 1/0278* (2013.01); *B60L 2200/40* (2013.01); *B60L 2240/16* (2013.01); *B60L 2240/22* (2013.01);
(Continued)

(58) Field of Classification Search
USPC ...................................................... 701/26, 50
See application file for complete search history.

(56) References Cited

U.S. PATENT DOCUMENTS 5,334,986 A * 8/1994 Fernhout .................. G01S 19/49
342/357.31
5,528,888 A * 6/1996 Miyamoto ........... A01B 69/008
56/10.2 F
(Continued)

FOREIGN PATENT DOCUMENTS

DE 102010007309 A1 8/2011
EP 0270415 B1 11/1991
(Continued)

OTHER PUBLICATIONS

Aono, T., et al. "Positioning of Vehicle on Undulating Ground Using GPS and Dead Reckoning," printed from http://ieeexplore.ieee.org/xpl/login.jsp?tp=8,arnumber=680970&url=http%3A%2F%2Fieeeexplore.ieee.org%2Fxpls%2Fabs_all.jsp%3Farnumber%3D680970 on Nov. 26, 2013, all enclosed pages cited.
(Continued)

*Primary Examiner* — Tyler J Lee
(74) *Attorney, Agent, or Firm* — McNair Law Firm, P.A.

(57) ABSTRACT

A robotic work tool system (200) comprising a charging station (210) and a robotic work tool (100), said robotic work tool (100) comprising a position determining device (190) for determining a current position and at least one deduced reckoning navigation sensor (195), the robotic work tool (100) being configured to determine that a reliable current position is possible to determine and in response thereto calibrate at least one of the at least one deduced reckoning navigation sensor (195).

20 Claims, 2 Drawing Sheets

(51) Int. Cl.
*B60L 1/00* (2006.01)
*B60L 11/14* (2006.01)

(52) U.S. Cl.
CPC ....... *B60L 2240/62* (2013.01); *B60L 2260/32* (2013.01); *G05D 2201/0208* (2013.01); *Y02T 10/70* (2013.01); *Y02T 10/7077* (2013.01); *Y02T 10/7291* (2013.01); *Y02T 90/16* (2013.01); *Y02T 90/162* (2013.01)

(56) References Cited

U.S. PATENT DOCUMENTS

| | | | |
|---|---|---|---|
| 5,650,703 A | | 7/1997 | Yardley et al. |
| 5,670,872 A | | 9/1997 | Van De Walle et al. |
| 5,938,704 A | * | 8/1999 | Torii .................... G05D 1/0227 180/168 |
| 6,272,405 B1 | | 8/2001 | Kubota |
| 6,308,134 B1 | | 10/2001 | Croyle et al. |
| 7,272,467 B2 | * | 9/2007 | Goncalves ............. G01C 21/12 180/168 |
| 7,403,853 B1 | | 7/2008 | Janky et al. |
| 8,983,709 B2 | * | 3/2015 | Bando .................. G05D 1/0274 324/654 |
| 9,163,942 B2 | * | 10/2015 | Hernando ............. G01C 21/28 |
| 2002/0156556 A1 | | 10/2002 | Ruffner |
| 2004/0138799 A1 | * | 7/2004 | Makela .................. G01C 21/12 701/50 |
| 2007/0050193 A1 | * | 3/2007 | Larson ................. G07C 5/0841 701/99 |
| 2008/0039991 A1 | | 2/2008 | May et al. |
| 2010/0161179 A1 | | 6/2010 | McClure et al. |
| 2011/0202175 A1 | | 8/2011 | Romanov et al. |
| 2012/0221244 A1 | | 8/2012 | Georgy et al. |
| 2013/0218397 A1 | | 8/2013 | Griffini et al. |
| 2015/0073697 A1 | * | 3/2015 | Barrett .................... G01S 19/39 701/409 |

FOREIGN PATENT DOCUMENTS

| | | |
|---|---|---|
| EP | 1756687 B1 | 4/2012 |
| EP | 2519803 B1 | 1/2014 |
| WO | 9305587 A1 | 3/1993 |

OTHER PUBLICATIONS

Park K., et al., "Dead reckoning navigation for an autonomous mobile robot using a differential encoder and a gyroscope," printed from http://ieeexplore.ieee.org/xpl/login.jsp?tp=&arnumber=620219 &url=http%3A%2F%2Fieeexplore.ieee.org%2Fxpls%2Fabs_alt.jsp%3Farnumber%3D620219 on Nov. 26, 2013, all enclosed pages cited.

Martin, M., et al., "Benefits of Low-Cost INS/GPS to Augment Land Navigation," printed from http://www.ion.org/publications/abstract.cfm?articleID=3263 on Nov. 26, 2013, all enclosed pages cited.

Rogers, R., "Land Vehicle Navigation Filtering for a GPS/Dead-Reckoning System," printed from http://www.ion.org/publications/abstract.cfm?articleID=529 on Nov. 26, 2013, all enclosed pages cited.

Yeh, M., et al., "Lawn Transformer," printed from http://robomow.ion.org/wp-content/uploads/2012/09/2012_Report_Fullerton.pdf published 2012, all enclosed pages cited.

Farner, W., et al., "Design and Prototype of a Self-Navigating Intelligent Programmable Mower," printed from edge.rit.edu/edge/P06113/public/P06113_Conference_Paperdoc on Nov. 26, 2013, all enclosed pages cited.

Groves, P.D., et al., "Adaptive tightly-coupled, a low cost alternative anti-jam INS/GPS integration technique," printed from http://www.ion.org/publications/abstract.cfm?articleID=3786 on Nov. 26, 2013, all enclosed pages cited.

Zhan, et al., "LOBOT: Low-Cost, Self-Contained Localization of Small-Sized Ground Robotic Vehicles," IEEE Transactions on Parallel and Distributed Systems vol. 24, No. 4, Apr. 2013, all enclosed pages cited.

International Search Report and Written Opinion of corresponding application No. PCT/SE2013/051329 dated Aug. 13, 2014, all enclosed pages cited.

* cited by examiner

NAVIGATION FOR A ROBOTIC WORKING TOOL

TECHNICAL FIELD

This application relates to a method and a robotic work tool system for an improved navigation for a robotic work tool.

BACKGROUND

Contemporary robotic work tools are becoming more and more advanced and are able to perform more and more advanced tasks such as executing advanced operation patterns. In the example of lawnmower robots the advanced working pattern may be a complicated mowing pattern based on the layout of a garden including bushes, garden islands and other structures. To successfully navigate such complicated areas some contemporary robotic work tools employ satellite navigation.

A satellite navigation or sat nav system is a system of satellites that provide autonomous geo-spatial positioning with global coverage. It allows small electronic receivers to determine their location (longitude, latitude, and altitude) to within a few meters, or even centimeters, using signals transmitted along a line-of-sight by radio from satellites. Receivers calculate the precise time as well as position and carrier phase, which can be used as a reference for scientific experiments. A satellite navigation system with global coverage may be termed a global navigation satellite system or GNSS (Global Navigation Satellite System).

The use of GNSS systems requires good reception of satellite signals to work reliably. The satellite signals may sometimes be blocked by buildings, roofs, awnings, foliage or trees. To improve the accuracy of GNSS systems a reference receiver, or beacon, within a short distance from the target receiver can be used. This is called differential GNSS. There are several DGNSS techniques, such as the classical DGNSS (or DGPS), the Real Time Kinematics (RTK) and the Wide Area RTK (WARTK).

However, the signal from a beacon may also be blocked by for example a house if the garden or other work area extends around the building.

It should be noted that similar problems exist also for other position determining devices, such as using optical beacons where the line of sight may be blocked in certain areas.

If the robotic work tool is unable to correctly receive the signals from the position determining system, the robotic work tool will be challenged to correctly navigate the work area and a satisfactory coverage of the work area may not be achieved by the robotic work tool.

Even though the problems above have been discussed for lawnmower robotic work tools, the same or similar problems exist also for other robotic work tools.

There is thus a need for a manner of enabling reliable operation of a robotic work tool even in situations where the robotic work tool may not be able to receive reliable and accurate signals.

SUMMARY

It is an object of the teachings of this application to overcome the problems listed above by providing a robotic work tool system, comprising a robotic work tool, said robotic work tool comprising a position determining device for determining a current position and at least one deduced reckoning (also known as dead reckoning) navigation sensor, the robotic work tool being configured to determine that a reliable and accurate current position is possible to determine and in response thereto calibrate at least one of the at least one deduced reckoning navigation sensor.

In one embodiment the robotic work tool is further configured to determine an expected navigation parameter, compare the expected navigation parameter to a current navigation parameter to determine a navigation error, determine if the navigation error is negligible, and if the navigation error is not negligible, calibrate the deduced reckoning navigation sensor. The navigation parameter may be one or a combination taken from the group of navigation parameters comprising position, speed, direction, tilt angle, and acceleration.

In one embodiment the robotic work tool is a farming equipment, a vacuum cleaner, a floor cleaner, a street sweeper, a snow removal tool, a golf ball retriever robot, a cleaner robot, a leaves blower robot, a leaves collector robot, snow thrower robot or a mine clearance robot.

It is also an object of the teachings of this application to overcome the problems listed above by providing a method for use in a robotic work tool system comprising a robotic work tool, said robotic work tool comprising a position determining device for determining a current position and at least one deduced reckoning navigation sensor, the method comprising determining that a reliable current position is possible to determine and in response thereto calibrating at least one of the at least one deduced reckoning navigation sensor.

The inventors of the present invention have realized, after inventive and insightful reasoning that by comparing an expected position to a current position (or other navigation parameter) an error of the deduced reckoning navigation sensor may be determined and based on this, the deduced reckoning navigation sensor may be calibrated. The robotic work tool will thus be able to perform satisfactory without unneeded stops even in areas where position determining device is not reliable while still being able to perform a complicated operating pattern. As signals may be reliably received in most situations only smaller sections of a work area will be (herein referred to as) a blackout section. Should the robotic work tool not follow a complicated operating pattern exactly in those smaller sections, a satisfactory over-all operation will still be achieved. It is also possible to provide and execute complicated operating patterns also in such smaller areas.

Other features and advantages of the disclosed embodiments will appear from the following detailed disclosure, from the attached dependent claims as well as from the drawings. Generally, all terms used in the claims are to be interpreted according to their ordinary meaning in the technical field, unless explicitly defined otherwise herein. All references to "a/an/the [element, device, component, means, step, etc]" are to be interpreted openly as referring to at least one instance of the element, device, component, means, step, etc., unless explicitly stated otherwise. The steps of any method disclosed herein do not have to be performed in the exact order disclosed, unless explicitly stated.

BRIEF DESCRIPTION OF DRAWINGS

The invention will be described in further detail under reference to the accompanying drawings in which.

DETAILED DESCRIPTION

The disclosed embodiments will now be described more fully hereinafter with reference to the accompanying drawings, in which certain embodiments of the invention are shown. This invention may, however, be embodied in many different forms and should not be construed as limited to the embodiments set forth herein; rather, these embodiments are provided by way of example so that this disclosure will be thorough and complete, and will fully convey the scope of the invention to those skilled in the art. Like numbers refer to like elements throughout.

Figure 1:
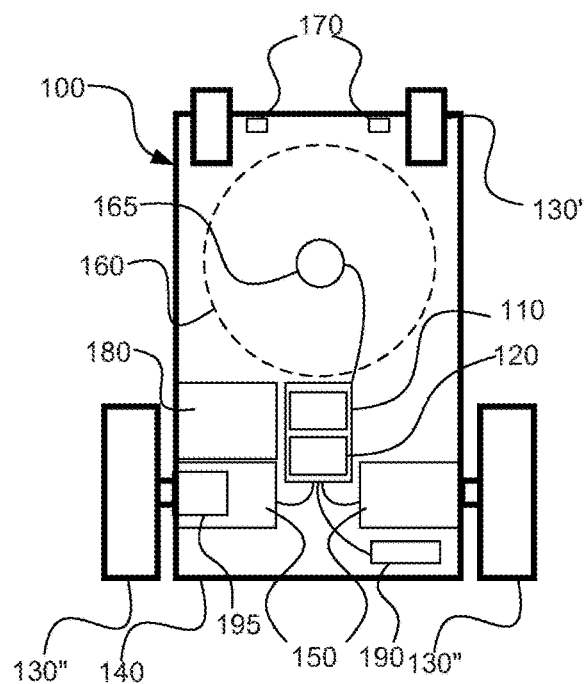
FIG. 1 shows a schematic overview of a robotic work tool according to one embodiment of the teachings of this application.

FIG. 1 shows a schematic overview of a robotic work tool 100 having a body 140 and a plurality of wheels 130. In the exemplary embodiment of FIG. 1 the robotic work tool 100 has 4 wheels 130, two front wheels 130' and the rear wheels 130". At least some of the wheels 130 are drivably connected to at least one electric motor 150. It should be noted that even if the description herein is focussed on electric motors, combustion engines may alternatively be used possibly in combination with an electric motor.

In the example of FIG. 1, the rear wheels 130" are connected to each an electric motor 150. This allows for driving the rear wheels 130" independently of one another which, for example, enables steep turning.

The robotic work tool 100 also comprises a controller 110. The controller 110 may be implemented using instructions that enable hardware functionality, for example, by using executable computer program instructions in a general-purpose or special-purpose processor that may be stored on a computer readable storage medium (disk, memory etc) 120 to be executed by such a processor. The controller 110 is configured to read instructions from the memory 120 and execute these instructions to control the operation of the robotic work tool 100. The controller 110 may be implemented using any suitable, publically available processor or Programmable Logic Circuit (PLC). The memory 120 may be implemented using any commonly known technology for computer-readable memories such as ROM, RAM, SRAM, DRAM, FLASH, DDR, SDRAM or some other memory technology.

The robotic work tool 100 further may have at least one sensor 170, in the example of FIG. 1 there are two sensors 170, arranged to detect a magnetic field (not shown). The sensors are connected to the controller 110 and the controller 110 is configured to process any signals received from the sensors 170. The sensor signals may be caused by the magnetic field caused by a control signal being transmitted through a boundary wire (for more details on charging stations, control signals and boundary wires, see the description below with reference to FIG. 2). This enables the controller 110 to determine whether the robotic work tool 100 is inside or outside an area enclosed by a boundary wire.

It should be noted that the teachings herein may also be used for a robotic work tool that is configured to operate in a work area, where the work area is not bounded by a boundary wire. Examples of such robotic work tools are tools arranged to physically detect a boundary by collision detection, or a robotic work tool that uses a position determination system (such as GNSS) to maintain a position within the work area, which work area is specified by coordinates.

The controller 110 is connected to the motors 150 for controlling the propulsion of the robotic work tool 100 which enables the robotic work tool 100 to service an enclosed area without leaving the area.

The robotic work tool 100 also comprises a work tool 160, which may be a grass cutting device, such as a rotating blade 160 driven by a cutter motor 165. The cutter motor 165 is connected to the controller 110 which enables the controller 110 to control the operation of the cutter motor 165. The controller is also configured to determine the load exerted on the rotating blade, by for example measure the power delivered to the cutter motor 165 or by measuring the axle torque exerted by the rotating blade. The robotic work tool 100 is, in one embodiment, a lawnmower robot. In one embodiment the robotic work tool 100 is a farming equipment. In one embodiment the robotic work tool 100 is a golf ball collecting tool.

The robotic work tool 100 may also be a vacuum cleaner, a floor cleaner, a street sweeper, a snow removal tool, a mine clearance robot or any other robotic work tool that is required to operate in a work area in a methodical and systematic or position oriented manner.

The robotic work tool 100 also has (at least) one battery 180 for providing power to the motors 150 and the cutter motor 165. Alternatively or additionally the robotic work tool may have a fuel tank 180 for supplying fuel to any other type of engine 150.

The robotic work tool 100 is also arranged with a position determining device 190, such as a GNSS (Global Navigation Satellite System) device 190. In one embodiment the GNSS device is a GPS (Global Positioning Service) device 190. The GNSS device 190 is connected to the controller 110 for enabling the controller 110 to determine a current position for the robotic work tool 100 using the GNSS device and to control the movements of the robotic work tool 100 based on the position.

Other examples of position determining devices 190 include optical (such as laser) position determining devices, other radio frequency position determining systems, and ultrawideband (UWB) beacons and receivers. The robotic work tool 100 is further arranged with at least one sensor 195 for providing signals for deduced reckoning navigation. Examples of such deduced reckoning navigation sensors 195 are odometers, accelerometers, gyroscopes and compasses.

Figure 2:
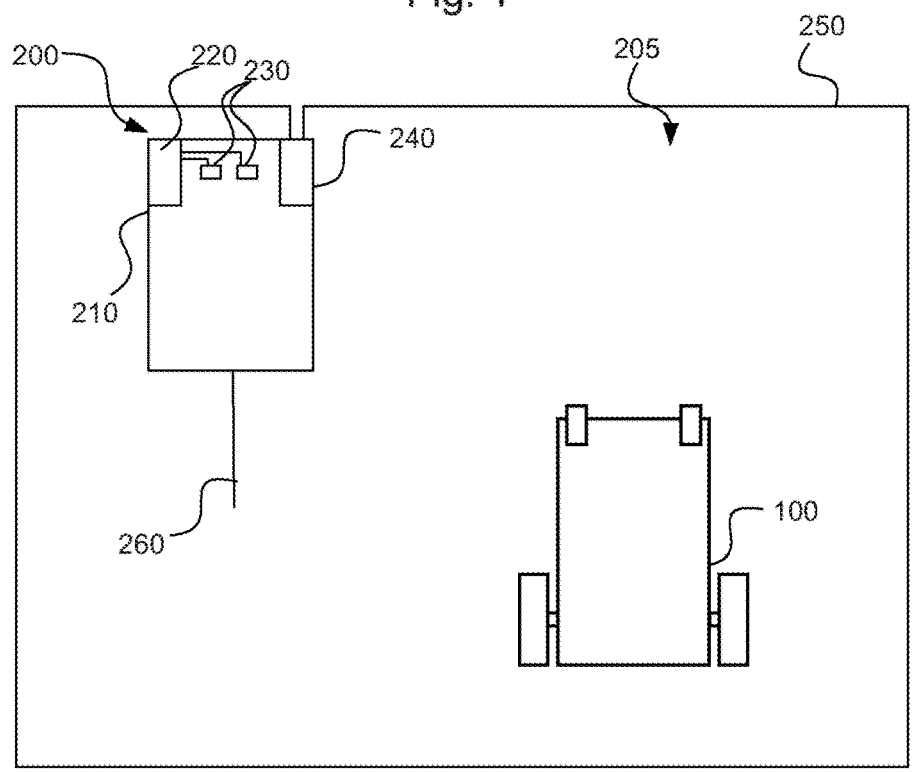
FIG. 2 shows a schematic view of a robotic working tool system according to one embodiment of the teachings of this application.

FIG. 2 shows a schematic view of a robotic work tool system 200 comprising a charging station 210 and a boundary wire 250 arranged to enclose a working area 205, the working area 205 not necessarily being a part of the robotic work tool system 200, in which the robotic work tool 100 is supposed to service. The charging station 210 has a charger 220 coupled to, in this embodiment, two charging plates 230. The charging plates 230 are arranged to co-operate with corresponding charging plates (not shown) of the robotic work tool 100 for charging the battery 180 of the robotic work tool 100. The charging station 210 also has, or may be coupled to, a signal generator 240 for providing a control signal (not shown) to be transmitted through the boundary wire 250. The control signal preferably comprises a number of periodic current pulses. As is known in the art, the current pulses will generate a magnetic field around the boundary wire 250 which the sensors 170 of the robotic work tool 100 will detect. As the robotic work tool 100 (or more accurately, the sensor 170) crosses the boundary wire 250 the direction of the magnetic field will change. The robotic work tool 100 will thus be able to determine that the boundary wire has been crossed. The use of more than one sensor 170 enables the controller 110 of the robotic work tool 100 to determine how the robotic work tool 100 is aligned with relation to the boundary wire 250 by comparing the sensor signals received from each sensor 170. This enables the robotic work tool to follow the boundary wire 250, for example when returning to the charging station 210 for charging.

Optionally, the charging station 210 also has a guide cable 260 for enabling the robotic work tool to find the entrance of the charging station 210. In one embodiment the guide cable 260 is formed by a loop of the boundary wire 250. In one embodiment the guide wire 260 is used to generate a magnetic field for enabling the robotic work tool 100 to find the charging station without following a guide cable 260.

Figure 3:
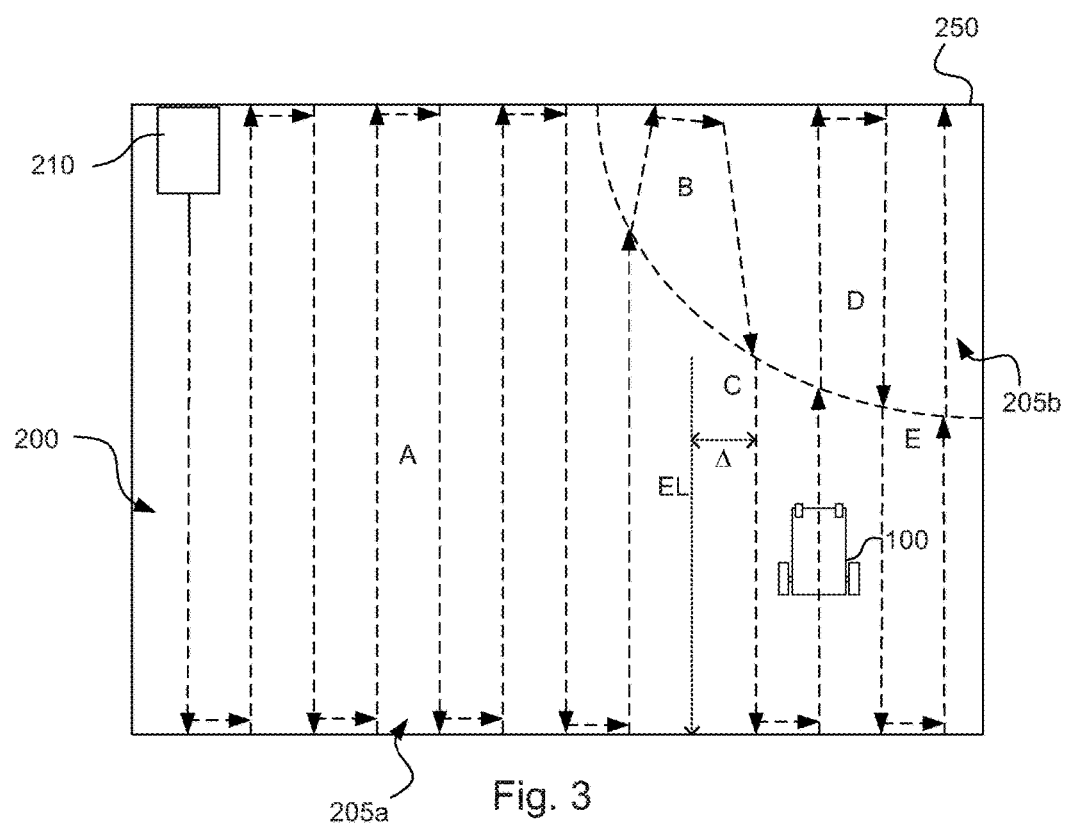
FIG. 3 shows a schematic view of a robotic working tool system in operation according to one embodiment of the teachings of this application.

FIG. 3 shows another schematic view of a robotic work tool system 200 according to the teachings herein, such as the robotic work tool system 200 of FIG. 2, being depicted here at a larger scale.

A boundary wire 250 encloses a working area 205 in which the robotic work tool 100 is configured to operate within. The working area 205 has a first section 205a in which GNSS navigation is possible and a second section 205b in which GNSS navigation is not possible. The first section 205 will hereafter be referred to as a GNSS section 205a and the second section 205b will be referred to as a blackout section 205b. The reason why GNSS navigation is not possible in the blackout section 205b may be due to buildings, roofs, awnings, trees or other foliage blocking the satellite signals or making the satellite signals unreliable.

The robotic work tool 100 is configured to utilize its GNSS device 190 to control its working operation. In the example of the robotic work tool 100 being a lawnmower robot, the controller 110 determines a mowing pattern based on a position of the robotic work tool 100. The mowing pattern may be determined as a heading to be taken or a circular pattern or other mowing pattern. The mowing pattern may also be based on a map of the work area 250. Such mowing patterns are known to a skilled person and will not be discussed further herein.

In the example of FIG. 3 the robotic work tool 100 is configured to operate in a manner determined based on a position retrieved from the GNSS device 190 as long as the GNSS device 190 is able to receive reliable signals from enough satellites or enough beacons. The controller 110 or the GNSS device 190 itself is configured to determine that the signals received are reliable and in response thereto determine execute a working pattern.

When the robotic work tool 100 is not able to receive reliable satellite signals, the controller 110 is configured to continue operation using an alternative navigation system or to determine an alternative mowing pattern that does not require (advanced) position determining.

It should be noted that when discussing the ability of receiving reliable signals it is meant to receive enough signals to establish a position reliably. The number of signals needed for this differs from GNSS device 190 to GNSS device 190 depending on which GNSS technology that is implemented in the GNSS device 190, as well as the operation and safety issues of the robotic work tool 100. For example, if only the position is of interest it suffices to receive three reliable signals to establish a reliable position, whereas if, for example, the amplitude or time is also of relevance, a fourth signal need be reliably received.

According to one embodiment of the teachings herein the robotic work tool 100 is configured to switch to deduced reckoning navigation when it determines that a reliable position may no longer be established. Deduced reckoning works so that the last known position and direction is taken to be the current and assumed direction and by for example measuring the number of wheel turns (or rather turn speed of the wheel axel and the time) the current position is determined. It should be noted that the technique of deduced reckoning is also taken to include other forms of relative navigation, such as visual/optical navigation systems, SLAM (Simultaneous Location And Mapping) and fingerprint fusion to name a few. As the robotic work tool 100 encounters the boundary wire 250 it turns and by counting the number of wheel turns the new direction can be determined and the controller 110 may control the operation of the robotic work tool 100 based on the position determined based on the deduced reckoning. An odometer 195 may also be used to determine the current position or turning angle in the deduced reckoning navigation mode.

As can be seen in FIG. 3 the resulting operating pattern B (in this example the mowing pattern) may differ from the GNSS based operating pattern A due to an error in the sensor equipment 195, such as compass or odometers, used for the deduced reckoning navigation. To alleviate or at least reduce these errors the controller 110 is configured to calibrate the deduced reckoning navigation sensors 195 when the robotic work tool 100 is able to reliably receive GNSS signals.

In one embodiment the controller 110 is further configured to determine that there has been a deduced reckoning navigation error and in response thereto calibrate the deduced reckoning navigation sensor 195.

The controller 110 may be configured to determine that there has been a deduced reckoning navigation error by comparing a current position, which is received from the GNSS device 190, with an expected position and based on the difference determine that there is a non-negligible navigation error and in response thereto calibrate the deduced reckoning navigation sensor 195.

FIG. 3 shows an example situation where the robotic work tool 100 is executing a mowing pattern which is based on moving in parallel lines to cover the working area 205.

As the robotic work tool 100 traverses the GNSS section 205a of the work area 205 it is guided by the signals received by the GNSS device 190 and the lines are parallel and of equal length. The resulting mowing pattern is indicated A in the figure. As the robotic work tool 100 enters the blackout section 205b and is no longer able to receive reliable signals it switches to deduced reckoning navigation. The resulting mowing pattern B consists of almost parallel lines. However, depending on the angle between the movement lines and the distance travelled (i.e. the size of the blackout area 205b) the robotic work tool 100 will re-enter the GNSS section 205a at a distance from where it would have been if it had used GNSS navigation. As the robotic work tool 100 re-enters the GNSS section 205a, that is, when it again is able to receive reliable signals, it compares its current position with an expected position. In the example of FIG. 3 the robotic work tool 100 re-enters the GNSS section 205a at point C. There the robotic work tool 100 determines the distance A to the expected position. The expected position may be determined based on the time lapsed from last GNSS navigation session, the average speed of the robotic work tool 100 and the parameters of the mowing (or operation) pattern.

If the controller 110 determines that the error A is not negligible, the controller causes the deduced reckoning navigation sensor 195 to be calibrated.

It should be noted that the controller may also be configured to determine that the deduced reckoning navigation sensors need to be calibrated based on another navigation parameter. Examples of navigation parameters include, but are not limited to position (as described above), direction of travel, speed, acceleration and tilt angle. For example, as the robotic work tool re-enters the GNSS section, it may determine a current speed using the position determining device 190 and compare it to the speed determined by the deduced reckoning means and determine if the difference (the error) is negligible or not and calibrate accordingly.

In one embodiment the controller 110 is configured to continuously calibrate the sensors 195. In such an embodiment the error may be regarded as not being negligible if it is detectable. By adjusting what is considered to be a negligible error, the rate of calibration may be set accordingly. The adjustment may be made by the user or a controller/operator or be set by the designer of the robotic work tool.

If the robotic work tool 100 later enters a blackout section 205b, the deduced reckoning navigation sensor 195 will now be calibrated and the resulting mowing pattern, at position D, is more similar to the GNSS mowing pattern. And as the robotic work tool 100 again re-enters the GNSS section 205a, at position E, the robotic work tool 100 will be closer to its expected position.

The robotic work tool 100 is thus able to perform and execute a satisfactory operating pattern even if GNSS signals may not be reliably received in all sections of the work area 205.

It should be noted that in one embodiment the controller may also be configured to calibrate the deduced reckoning navigation sensors 195 as an actual position is determined within the blackout section 205b. Such a position may be determined partially, such as when coming upon a boundary wire. The robotic work tool then knows along which line the robotic work tool currently is and is able to perform at least a partial calibration.

In one embodiment, the robotic work tool 100 is further configured to correct its position and/or direction according to the detected error A. The correction may be that the robotic work tool 100 steers towards an expected movement line, referenced EL, in the mowing pattern or returns to the expected position. This enables the robotic work tool 100 to minimize the effects of any errors induced by the deduced reckoning navigation sensor 195 during the deduced reckoning navigation.

The controller 110 may be configured to calibrate the deduced reckoning navigation sensor 195, or rather calibrate the interpretation of the signals received from the deduced reckoning navigation sensor 195, by comparing the signals received from the deduced reckoning navigation sensor 195, or rather the physical meaning of the signals, with data based on the received GNSS signals. For example by comparing the odometer output with a distance travelled, which distance is determined based on the GNSS signals, the odometer may be calibrated. Similarly a compass may be calibrated by comparing the compass heading with a direction established based on the GNSS signals.

It should be noted that the teachings herein of calibrating the deduced reckoning sensors may also be used in other robotic work tool systems where deduced reckoning is used in combination with a position determining device such as a GNSS device 190. For example, a robotic work tool 100 may be configured to perform its navigation mainly using deduced reckoning and only intermittently receive signals from the GNSS device 190 and in between keeping the GNSS device 190, or other position determining device 190, inactive to reduce the overall power consumption of the robotic work tool 100.

One benefit of the teachings herein is that a robotic work tool is enabled to provide a satisfactory mowing pattern even if the robotic work tool 100 is not able to establish a reliable position using the GNSS device 190.

It should be noted that even though the mowing pattern shown in the exemplifying figures are very simple, the teachings herein may be beneficially used to provide advanced mowing patterns taking into account obstacles or other (garden) architectural features.

The invention has mainly been described above with reference to a few embodiments. However, as is readily appreciated by a person skilled in the art, other embodiments than the ones disclosed above are equally possible within the scope of the invention, as defined by the appended patent claims.

The invention claimed is:

1. A robotic work tool system comprising:
    a robotic work tool, said robotic work tool comprising:
        an electric motor powered by a battery and configured to drive a blade for lawn mowing;
        a position determining device for determining a current position of the robotic work tool,
        a controller configured to determine a mowing pattern based on the current position of the robotic work tool and configured to control movement of the robotic work tool to execute the mowing pattern;
        a deduced reckoning navigation sensor,
        wherein the controller is configured to determine that the current position is reliable based on a number of signals received by the position determining device, and, in response to determining that the current position is reliable, determine, via the controller, a calibrated interpretation of signals received from the deduced reckoning navigation sensor based on a position provided by the position determining device.

2. The robotic work tool system according to claim 1, wherein the robotic work tool is further configured to:
    determine an expected navigation parameter;
    compare the expected navigation parameter to a current navigation parameter to determine a navigation error ($\Delta$);
    determine if the navigation error ($\Delta$) is negligible; and
    if the navigation error ($\Delta$) is not negligible, calibrate the deduced reckoning navigation sensor.

3. The robotic work tool system according to claim 2, wherein the navigation parameter is one or a combination taken from the group of navigation parameters comprising position, speed, direction, tilt angle, and acceleration.

4. The robotic work tool system according to claim 2, wherein the robotic work tool is configured to correct the current position or a current direction based on the navigation error ($\Delta$).

5. The robotic work tool system according to claim 1, wherein the robotic work tool is configured to correct the current position by returning to an expected position.

6. The robotic work tool system according to claim 1, wherein the robotic work tool is configured to correct the current position by steering towards an expected movement line.

7. The robotic work tool system according to claim 1, wherein the controller is further configured to, in response to determining that the that the current position is unreliable based on the number of signals received by the position determining device, control movement of the robotic work tool to execute the mowing pattern based on calibrated interpretations of the signals received from the deduced reckoning navigation sensor.

8. The robotic work tool system according to claim 1, wherein the position determining device is a Global Navigation Satellite System device.

9. The robotic work tool system according to claim 1, wherein the robotic work tool is a robotic lawnmower.

10. The robotic work tool system according to claim 1, wherein the robotic work tool is a farming equipment, a vacuum cleaner, a floor cleaner, a street sweeper, a snow removal tool, a golf ball retriever robot, a cleaner robot, a leaves blower robot, a leaves collector robot, snow thrower robot or a mine clearance robot.

11. The robotic work tool of claim 1, wherein the robotic work tool is configured to determine whether the current position is reliable based on receipt of a threshold number of signals by the position determining device.

12. The robotic work tool of claim 1, wherein the robotic work tool is further configured to determine an alignment of the robotic work tool with the boundary wire by comparing sensor signals from a plurality of magnetic field detection sensors.

13. The robotic work tool of claim 1, wherein the deduced reckoning navigation sensor is one of an odometer, an accelerometer, a gyroscope, or a compass.

14. The robotic work tool of claim 1, wherein the deduced reckoning navigation sensor is one of an accelerometer, a gyroscope, or a compass.

15. The robotic work tool of claim 1, wherein the controller is further configured to continually determine calibrated interpretations of the signals received from the deduced reckoning navigation sensor, while the current position from the position determining device is determined to be reliable.

16. A method for use in a robotic work tool comprising:
driving a blade for lawn mowing via an electric motor powered by a battery;
determining that a current position of a robotic work tool is reliable based on a number of signals received by a position determining device, wherein the robotic work tool comprises the position determining device and a deduced reckoning navigation sensor;
determining, via a controller, a mowing pattern based on the current position of the robotic work tool;
controlling movement of the robotic work tool to execute the mowing pattern; and
in response to determining that the current position of the robot work tool is reliable, determining, via the controller, a calibrated interpretation of signals received from the deduced reckoning navigation sensor based on a position provided by the position determining device.

17. The method of claim 16 further comprising:
determining a first speed of the robotic work tool using the position determining device;
compare the first speed to a second speed determined by the deduced reckoning sensor to determine a speed error; and
calibrate the deduced reckoning sensor in response to the error exceeding a threshold.

18. The method of claim 16 wherein at least one of the signals received by the position determining device are received from a satellite.

19. The method of claim 16, further comprising, prior to determining the current position of the robotic work tool:
failing to receive a threshold number of signals by the position determining device;
in response to failing to receive the threshold number of signals by the position determining device, switching the robotic work tool to deduced reckoning navigation using the deduced reckoning sensor; and
in response to receiving the threshold number of signals by the position determining device, switching the robotic work tool to navigate using the position determining device;
wherein determining the position of the robotic work tool is performed in response to receiving the threshold number of signals by the position determining device.

20. The method of claim 16 further comprising, in response to determining that the current position of the robotic work tool is unreliable based on the number of signals received by the position determining device, determining an alternative movement pattern that does not require positioning based on the positioning determining device.

* * * * *